Figure 1:
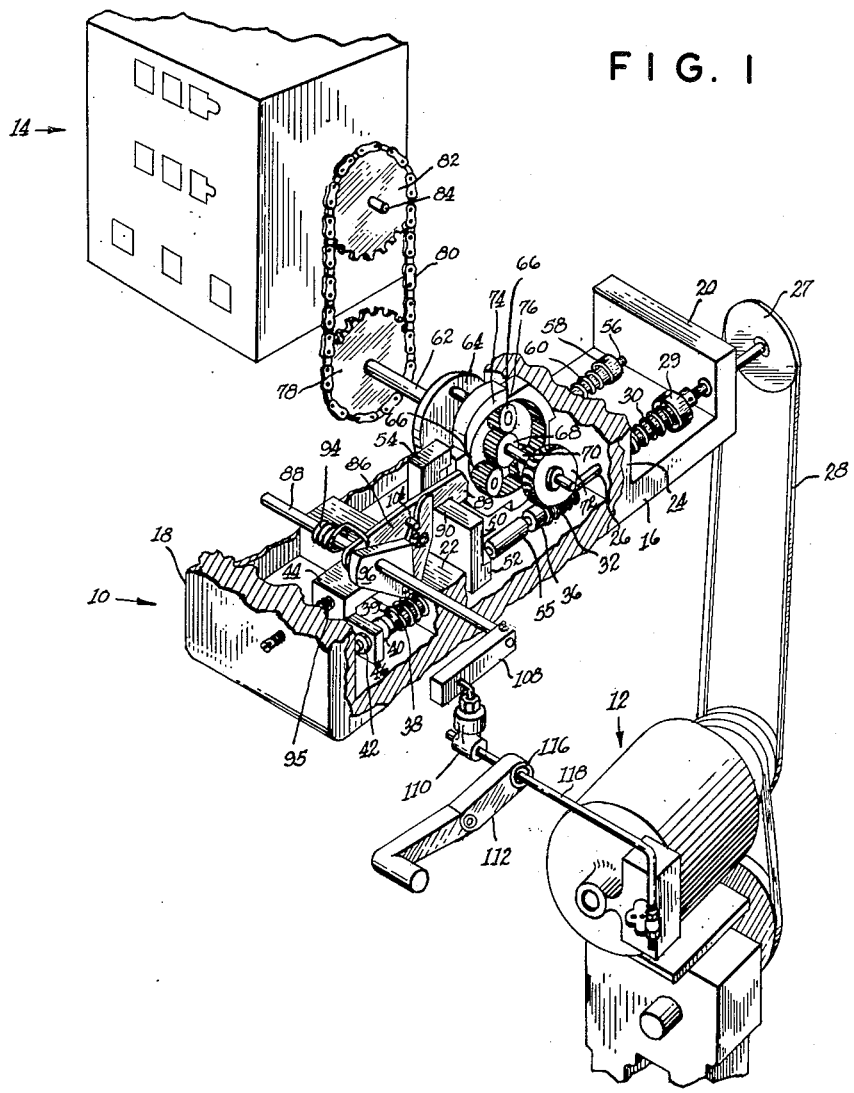

Jan. 22, 1957  G. KUHN  2,778,471
AUTOMATIC RESETTING MECHANISM FOR COMPUTERS
Filed Feb. 15, 1955  2 Sheets-Sheet 1

INVENTOR.
GEORGE KUHN
BY
*T. Wallace Omin*
HIS ATTORNEY

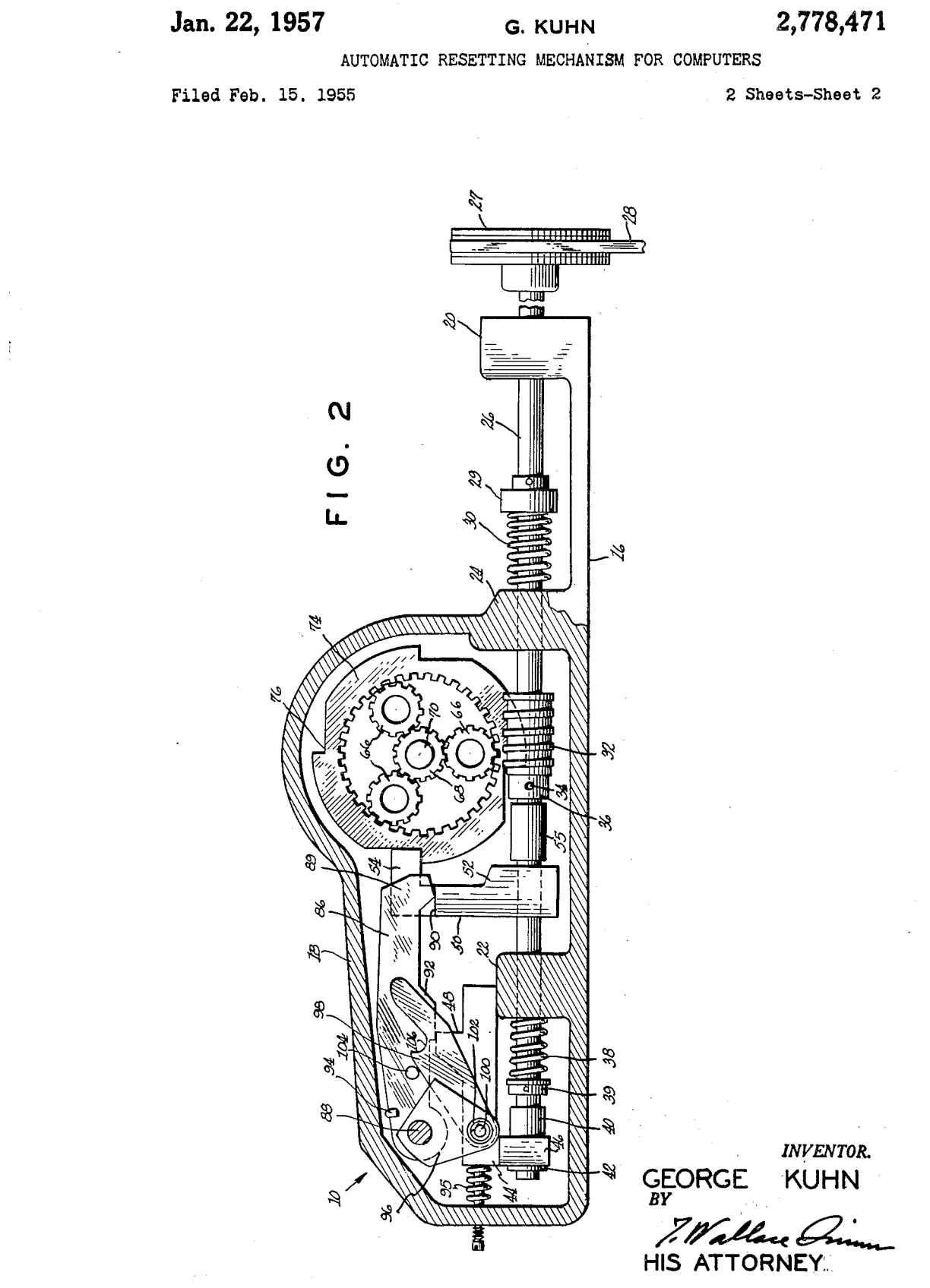

Jan. 22, 1957 G. KUHN 2,778,471
AUTOMATIC RESETTING MECHANISM FOR COMPUTERS
Filed Feb. 15, 1955 2 Sheets-Sheet 2

FIG. 2

INVENTOR.
GEORGE KUHN
BY
*T. Wallace Quinn*
HIS ATTORNEY

United States Patent Office 2,778,471
Patented Jan. 22, 1957

2,778,471

AUTOMATIC RESETTING MECHANISM FOR COMPUTERS

George Kuhn, Silver Spring, Md., assignor to The Wayne Pump Company, Salisbury, Md., a corporation of Maryland Application February 15, 1955, Serial No. 488,391

3 Claims. (Cl. 192—138)

This invention relates to an automatic resetting mechanism for computers, and particularly for that type computer employed in gasoline dispensers. More specifically, the invention relates to a rugged limit stop mechanism for automatically interrupting a power drive after a predetermined period of operation.

It has long been a practice in the gasoline dispensing art to employ computer or register mechanisms which must necessarily be reset at zero as an incident to and prior to the beginning of each dispensing operation. In the dispensers available to the trade, it has been common practice to employ manual resetting structures and/or independently driven mechanisms to zero the computer or register after completion of each dispensing operation. While some of the known arrangements have been relatively simple in design, they have failed to provide satisfactory service over the period of time desired without frequent servicing and replacement of parts.

It is therefore an object of the present invention to provide an improved resetting mechanism of the aforedescribed type. A particular object of the present invention is to provide a register or computer resetting mechanism which is actuated in conjunction with and operated by the motor employed to drive the gasoline dispensing pump of the dispensing equipment. Another object of the invention is to provide a computer resetting mechanism which is sufficiently rugged and durable to provide lengthy service without replacement or repair. Other and distinct objects of the invention will become apparent from the description and claims which follow, when considered in connection with the accompanying drawings wherein:

Fig. 1 is a prospective view of a resetting mechanism and its associated parts embodying the present invention showing the housing for the resetting mechanism partly broken away, Fig. 2 is a side-sectional view of the resetting mechanism shown in Fig. 1.

Referring now in greater detail to the drawing wherein similar reference characters refer to similar parts, there is shown a resetting mechanism, generally designated 10, which is operatively connected to a motor, generally designated 12, and which is also operatively connected to a register or computer mechanism, generally designated 14.

The resetting mechanism 10 comprises a base plate 16 which is integral with a housing 18 and which is also provided with a back plate 20 outside the housing. The base plate 16 is provided, within the housing 18, with an upstanding bearing member 22, and at the rear portion, where the housing is connected to the base plate, there is provided a bearing portion 24. A rotatable shaft 26 extends through the bearing member 20 and through the bearing members 22 and 24 to within the interior of the housing. The shaft 26, in addition to being rotatable, is also slidable within the respective bearing members. A pulley 27 is connected to the outer end of the shaft and a drive belt 28 operatively connects the pulley to the motor shaft.

Between the bearing member 20 and the bearing member 24 of the housing 18, the shaft 26 is provided with a fixed collar 29. A compression spring 30 surrounds the shaft between the collar 29 and the bearing member 24 and acts to urge the shaft to the right, as viewed in the drawings. Within the housing 18, the shaft 26 is provided with a worm 32 which is fixed to the shaft by a pin or the like 34 extending through the collar 36 of the worm. Also within the housing 18, but at the left hand side of the bearing member 22, as viewed in the drawings, a spring 38 surrounds the shaft 26 and is compressed between the bearing member 22 and a collar 39. Between a collar 40 and a lock washer 42, the shaft is provided with a sear block 44 having a perpendicular extension 46 which is connected to the shaft between the collar 40 and the lock washer 42. The sear block 44 is provided at the top thereof with a lug 48.

Also mounted on the shaft 26, within the housing 18, is a latch member 50 having a mounting portion 52 slidably mounted on the shaft 26 and also having a horizontally extending latch finger 54 on the top end thereof. A slidable spacing sleeve 55 extends between the latch member 50 and the worm collar 36. A rod 56 is connected, at one end, to the latch member in laterally spaced parallel relationship to the shaft 26. The rod 56 extends freely through an opening in the bearing section 24 of the housing 18, and a collar 58 is fixed thereto. Between the bearing portion 24 and the collar 58 is positioned a spring 60 in surrounding relationship to the rod 56, this spring 60 acting to bias the latch member 50 toward the right, as viewed in the drawings.

Extending through the side wall of the housing 18 is a shaft 62. This shaft 62 extends substantially perpendicularly to the shaft 26. Within the housing, the shaft 62 is connected to a circular plate 64, from one face of which projects a plurality of planetary gears 66 surrounding a sun gear 68. A shaft 70 projects from the sun gear 68 in axial alignment with the shaft 62 but independent thereof. On the shaft 70 is mounted a gear 72 which is adapted to mesh with the worm 32 on the shaft 26. A ring gear 74 rides freely upon the teeth of the planetary gears 66, the outer periphery of the ring gear 74 being provided with a series of notches 76, for a purpose to be hereinafter set forth.

The opposite end of the shaft 62, outside the housing, is provided with a sprocket 78 which transfers the motion of the planetary gear plate 64 to the computer resetting mechanism 14 by means of a chain 80 and sprocket 82. The sprocket 82 is mounted on a shaft 84 which extends into the interior of the computer housing and acts to reset the computer mechanism under the operative influence of the resetting mechanism 10. The computing mechanism itself is not shown since it comprises a generally well-known means and is not, in itself, part of the present invention; the present invention being confined to the resetting mechanism and its operating means, per se.

The construction of the parts is such that when the ring gear 74 is permitted to rotate, the planetary gear plate 64 is stationary and no motion is transferred to the sprocket 78. However, when the ring gear is held stationary, the planetary gear plate and, as a result, the sprocket 78, are caused to rotate, thereby acting to reset the computer mechanism. In order to prevent rotation of the ring gear by the planetary gears, the finger 54 of the latch means is caused to engage the notched periphery of the ring gear.

The latch assembly includes the sear block 44 upon which is adapted to rest a latch holder 86. This latch holder is pivoted at one end on pivot shaft 88 and at its opposite end it is provided with an engagement finger 89 adapted to engage the shoulder 90 of the latch 50 for holding the latch out of engagement with the periphery of the ring gear. The latch holder 86, which is provided with a downwardly extending lug 92 to engage upstanding lug 48 on the sear block, is biased downwardly by torsion spring 94 mounted on shaft 88. The sear block is biased toward the right, as viewed in the drawings, by an adjustable spring 95 extending between the inner front wall of the housing and the sear block.

A cam 96 is pivotally mounted on the shaft 88 coaxially with the latch holder 86. A cocking pawl 98 is pivotally connected to the cam at 100 and is spring-biased in the upward direction by a torsion spring 102. The pawl 98 is positioned to contact a roller 104 extending from the side of latch holder 86 and is provided with a notch 106 to engage the roller at a predetermined position of movement of the pawl.

The pivot shaft 88 is also connected by means of an arm 108 and adjustable linkage 110 to a lever 112, which is biased upwardly by a torsion spring 116. The operating lever 112 supports the hose nozzle, and when the nozzle is hung thereover, its weight holds the lever down against the force of the spring. When the hose nozzle is removed, the lever springs up and not only rocks the cam 96 but also actuates the motor 12 through rod 118.

In operation, when the hose nozzle is removed from the operating lever 112, the motor is automatically switched on and the computer automatically resets to zero. This operation is generally performed in about 1¾ seconds, but may be performed at an even faster rate, if desired.

When the hose nozzle is removed and the lever 112 is pulled upwards, the shaft 118 acts through linkage 108, 110 to rotate shaft 88 counterclockwise through a short arc. During this rotation, a series of consecutive operations take place. First, as the shaft 88 begins its rotation, it rocks cam 96, which causes the cocking pawl 98 to slide under the roller 104 under the upwardly directed force of its torsion spring 100 until the roller becomes engaged in notch 106. The cocking pawl then begins to lift the latch holder 86, thereby permitting the sear block 44 to move to the right, as viewed in the drawings, under the actuation of spring 95. This permits the sear block to slide under the latch holder 86. This releases the latch 50, which, since it is spring biased to the right, as viewed in the drawings, enables the latch finger 54 to move into engagement with the peripheral surface of the ring gear 74. At this point, the upper end of the pawl comes into engagement with the upper inner surface of the housing and begins to slide therealong. This action disengages the roller 104 from the notch 106 and permits the lug 92 of the latch holder to drop upon the lug 48 of the sear block to maintain the latch holder in inoperative position and to permit the latch to engage the ring gear 74.

As the motor switch is actuated by the rod 118, the worm 32 begins to rotate the ring gear 74 through gear 72 and through the sun and planetary gears. This rotation takes place in the clockwise direction and continues until the shoulder of the first notch comes into engagement with the latch finger 54. This is the position shown in Fig. 2. This engagement between the notch and the latch finger prevents further rotation of the ring gear. As the ring gear is held from rotation, the plate 64 is permitted to rotate and this in turn, rotates the sprocket 78 to actuate the computer resetting mechanism.

When the computer resetting shaft, not shown, reaches the limit of its motion, all the gears momentarily stop. The worm shaft 26, however, continues to rotate which causes the shaft to move axially to the left, as viewed in the drawings, under the driving action of the worm 32. This axial movement of the shaft 26 takes place against the compression of the overload spring 30. As the shaft 26 moves to the left, it also forces the drive engaging latch 50 to move to the left, whereby the latch finger 54 is moved out of engagement with the notch on the periphery of the ring gear. This permits the computer resetting shaft, not shown, to snap backwards, thereby opening the computer shutters. Thereupon, the worm shaft 26 springs back into its normal running position, its return motion being cushioned by the shock absorbing spring 38. The partial compression of the overload release spring 30 also serves to absorb most of the mechanical shocks of the computer resetting operation.

Upon completion of the dispensing action, replacement of the dispensing nozzle on the arm 112 serves to rock it to the "off" position to shut off the motor and to lock the latch mechanism in a retracted position.

As many apparently widely different embodiments of this invention may be made without departing from the spirit and scope hereof, it is to be understood that the above invention is not limited to any specific embodiment hereof, except as defined in the appended claims.

What is claimed is:

1. An automatically interruptable power drive mechanism for rotating a driven element a limited number of revolutions comprising a drive shaft having a worm fixed thereon, means supporting said drive shaft for rotation and axial translation, a planetary unit supported adjacent said drive shaft and including a driving sun gear, a driven carrier having planetary pinions meshing with said sun gear and an orbit gear meshing with said planetary pinions, a slidable latch element mounted adjacent said orbit gear and including structure for cooperating with said orbit gear to selectively arrest rotation of the latter, means normally biasing said latch element into engagement with said orbit gear to brake the latter, control means including a locking means positioned to cooperate with said latch and including structure adapted to retain said latch disengaged from said orbit against said bias means, a drive motor connected to rotate said drive shaft, a linkage mechanism interconnected between said control means and said motor and including structure for selectively energizing and deenergizing said motor, said control means further including structure operatively connected to said linkage for simultaneously releasing said locking means from said latch member upon movement of said linkage to energize said motor, said drive shaft being adapted to translate axially upon stoppage of rotation of said driven element and including structure for releasing said latch element from engagement with said orbit gear upon the occurrence of such condition.

2. A control linkage for selectively braking a controllable element of a three element planetary gear train and for releasing said element for free rotation to interrupt transmission of power therethrough when rotation of another element of said planetary gear train is arrested comprising, a driven element including structure limiting the number of revolutions which it may turn, said planetary train having one element thereof connected to said driven member, a driving element for said planetary train and having connected therewith a worm wheel, a rotatable and axially translatable drive shaft positioned adjacent said worm wheel and including a worm gear in mesh with said wheel, means to selectively drive said worm shaft, a latch element positioned adjacent said controllable element of said planetary gear train and including structure for arresting rotation of said controllable element, means adapted to cooperate with said control structure to arrest rotation of said one element, and means carried by said drive shaft for cooperation with said control member to actuate said control member to free said controllable element of said planetary gear train for rotation when said driven shaft is stopped and said worm shaft translates under the overriding action of said worm on said worm wheel.

3. A power stop control mechanism for interrupting the delivery of power to a driven element upon the stoppage of movement of the driven element comprising an overload release mechanism having a driving shaft adapted to be connected to a motor means, a driven shaft adapted to be connected to said driven element, a planetary gear train operatively associated with said driven shaft and including a normally freely rotatable control element and a driving element, worm and worm gear means connected between said driving shaft and said driving element of said planetary gear train, means supporting said driving shaft for axial translation, means positioned adjacent to said planetary gear train including structure for selectively arresting rotation of said freely rotatable element of said gear train, resilient means normally biasing said control means to a position to hold said control element from rotation, said drive shaft further supporting structure for cooperation with said control means to disengage said control means from said control element when said driven element stops through the locking up of said planetary gear train and said worm and worm gear to cause axial displacement of said driving shaft.

References Cited in the file of this patent

UNITED STATES PATENTS

| | | |
|---|---|---|
| 1,815,345 | Colman | July 21, 1931 |
| 2,541,515 | Hoffman et al. | Feb. 13, 1951 |
| 2,695,089 | Unk et al. | Nov. 23, 1954 |

FOREIGN PATENTS

| | | |
|---|---|---|
| 502,382 | Great Britain | Mar. 16, 1939 |